United States Patent [19]

Hirano

[11] Patent Number: 5,747,682

[45] Date of Patent: May 5, 1998

[54] APPARATUS FOR DETERMINING AN ESTIMATED QUANTITY OF A STATE OF MOTION OF A VEHICLE

[75] Inventor: Yutaka Hirano, Susono, Japan

[73] Assignee: Toyota Jidosha Kabushiki Kaisha, Toyota, Japan

[21] Appl. No.: 743,225

[22] Filed: Nov. 5, 1996

[30] Foreign Application Priority Data

Nov. 24, 1995 [JP] Japan .................................. 7-306281

[51] Int. Cl.$^6$ ...................................... G01M 15/00
[52] U.S. Cl. ............................. 73/118.1; 364/426.015; 364/426.018; 364/426.025
[58] Field of Search ................................ 73/116, 117.2, 73/117.3, 118.1; 364/426.015, 426.016, 426.017, 426.018, 426.019, 426.025, 426.036; 340/438

[56] References Cited

U.S. PATENT DOCUMENTS

| | | | |
|---|---|---|---|
| 4,942,532 | 7/1990 | Mori | 364/424.092 |
| 4,984,165 | 1/1991 | Muller et al. | 364/426.019 |
| 5,003,480 | 3/1991 | Mori et al. | 364/424.052 |
| 5,029,660 | 7/1991 | Raad et al. | 364/424.052 |
| 5,157,611 | 10/1992 | Ikeda et al. | 364/426.036 |
| 5,211,452 | 5/1993 | Okazaki et al. | 364/426.025 |
| 5,267,160 | 11/1993 | Ito et al. | 364/424.052 |
| 5,275,475 | 1/1994 | Hartmann et al. | 364/426.016 |
| 5,311,431 | 5/1994 | Cao et al. | 364/426.016 |
| 5,311,433 | 5/1994 | Igata et al. | 364/426.025 |
| 5,325,300 | 6/1994 | Tsuyama et al. | 364/426.025 |
| 5,357,434 | 10/1994 | Zimmer et al. | 364/426.019 |
| 5,412,571 | 5/1995 | Eguchi et al. | 364/424.052 |
| 5,524,079 | 6/1996 | Ishida et al. | 364/424.052 |

FOREIGN PATENT DOCUMENTS

| | | |
|---|---|---|
| 62-83247 | 4/1987 | Japan . |
| 62-88665 | 4/1987 | Japan . |
| 2-45802 | 2/1990 | Japan . |
| 3-125940 | 5/1991 | Japan . |
| A4-5802 | 1/1992 | Japan . |
| A-5-270422 | 10/1993 | Japan . |

OTHER PUBLICATIONS

Palkovics, "Effect of the Controller Parameters on the Steerability of the Four Wheel Steered Car", *Vehicle System Dynamics*, vol. 21, No. 2 (1992), pp. 109–114.

Tran, "Handling Control with Additional Rear Wheel Steering", *Total Vehicle Dynamics*, vol. 1 (1992), pp. 75–81.

*Primary Examiner*—George M. Dombroske
*Attorney, Agent, or Firm*—Oliff & Berridge, PLC

[57] ABSTRACT

A vehicle state estimating apparatus includes a slip-angle determining unit which determines a slip angle of a wheel of a vehicle. A friction-coefficient determining unit determines a friction coefficient between a tire of the wheel and a road. A tire characteristics unit generates a lateral force of the wheel from the slip angle and the friction coefficient based on predetermined tire characteristics. A vehicle-state estimating unit determines an estimated quantity of a state of motion of the vehicle based on the lateral force output by the tire characteristics unit. A vehicle-state observing unit detects an observed quantity for the estimated quantity determined by the vehicle-state estimating unit. A friction-coefficient correcting unit corrects the friction coefficient determined by the friction-coefficient determining unit, based on a difference between the observed quantity and the estimated quantity, so that the lateral force generated by the tire characteristics unit is corrected by the corrected friction coefficient.

10 Claims, 4 Drawing Sheets

APPARATUS FOR DETERMINING AN ESTIMATED QUANTITY OF A STATE OF MOTION OF A VEHICLE

BACKGROUND OF THE INVENTION

1. Field of the Invention

The present invention generally relates to a vehicle state estimating apparatus, and more particularly to a vehicle state estimating apparatus which determines an estimated quantity of a state of motion of a vehicle by using a non-linear vehicle model.

2. Description of the Related Art

Japanese Laid-Open Patent Application No. 5-270422 teaches a vehicle state estimating apparatus in which a vehicle slip angle "β" is determined based on a lateral acceleration "Gy", a yaw rate "Y", and a vehicle speed "V". The vehicle slip angle β is an angle of a direction of a slipping force on the center of gravity of the vehicle with respect to a forward running direction of the vehicle.

Generally, when the vehicle is turning in a circle at a constant speed "V", the lateral acceleration "Gy" on the center of gravity of the vehicle is represented by the equation: Gy=V·Y where Y is the yaw rate. When the vehicle moves at a varying lateral speed "Vy" in a lateral direction, the lateral acceleration Gy on the center of gravity of the vehicle is represented by the equation: Gy=dvy/dt. Therefore, the lateral acceleration Gy on the center of gravity of the vehicle when the vehicle is running with the turning movement and the lateral movement is represented by the equation:

$$Gy=V \cdot Y + dVy/dt \qquad (1)$$

If the vehicle slip angle β is small, the vehicle slip angle B can be expressed by the equation: β=Vy/V where Vy is the lateral speed. When the vehicle speed V is constant, the above Equation (1) can be rewritten by using the expression of the vehicle slip angle β, as follows.

$$Gy=V \cdot Y + V \cdot d\beta/dt \qquad (2)$$

From the above Equation (2), the vehicle slip angle β is represented by the following integration formula using the lateral acceleration Gy, the yaw rate Y, and the vehicle speed V:

$$\beta = \int \{(Gy/V) - Y\} dt \qquad (3)$$

The apparatus of the above publication determines a lateral force on a vehicle wheel based on tire characteristics, and determines the lateral acceleration Gy based on the determined lateral force. The tire characteristics define a relationship between the lateral force and the vehicle slip angle using a friction coefficient "μ" as a parameter for the relationship. If the lateral force and the friction coefficient are given as inputs, an estimated vehicle slip angle can be determined based on the tire characteristics.

If an optimal value of the friction coefficient "μ" between the tire and the road can be determined from an operating condition of the vehicle, the apparatus of the above publication can accurately determine the lateral acceleration Gy based on the tire characteristics.

The vehicle state estimating apparatus of the above publication includes a yaw rate sensor and determines an observed yaw rate "Yr" of the vehicle based on a signal output from the yaw rate sensor. Also, the apparatus of the above publication determines an estimated yaw rate "Ye" of the vehicle based on the tire characteristics. If an optical value of the friction coefficient: "μ" is determined, the estimated yaw rate "Ye" is equal to the observed yaw rate "Yr", that is, the deviation or "error" between the observed yaw rate "Yr" and the estimated yaw rate "Ye" is zero.

Otherwise, in the apparatus of the above publication, the error between the observed yaw rate "Yr" and the estimated yaw rate "Ye" is fed back to the tire characteristics as an input for determining the lateral force on the vehicle wheel. At this time, a corrected lateral force on the vehicle wheel is determined based on the tire characteristics so as to eliminate the error between the two yaw rates, and a lateral acceleration "Gy" is determined based on the corrected lateral force. In this manner, the apparatus of the above publication can accurately determine the lateral acceleration Gy based on the tire characteristics.

By substituting the thus determined lateral acceleration Gy, the observed vehicle speed V and the observed yaw rate Yr into the above Equation (3), a vehicle slip angle "B" is determined by the apparatus of the above publication. It is possible to accurately determine the vehicle slip angle β if the determined lateral acceleration Gy, the observed vehicle speed V and the observed yaw rate Yr are accurate.

However, in the apparatus of the above publication, the vehicle slip angle β is determined by computing the integration including the variables: the lateral acceleration Gy, the vehicle speed V, and the yaw rate Yr. This vehicle slip angle β is considerably influenced by an error produced by the determination of the lateral acceleration Gy and errors produced by the detections of the yaw rate Y and the vehicle speed V.

Therefore, it is difficult for the apparatus of the above publication to provide high accuracy of the estimated vehicle slip angle β when the determined lateral acceleration Gy, the observed vehicle speed V and the observed yaw rate Yr include respective errors. It is likely that the accuracy of the estimated vehicle slip angle β be lowered due to the error by the determination of the lateral acceleration Gy and the errors by the detections of the yaw rate Y and the vehicle speed V.

As described above, in the apparatus of the above publication, the estimated vehicle slip angle β is determined in accordance with the integration formula using the lateral acceleration Gy, the yaw rate Y, and the vehicle speed V. Even if the lateral acceleration Gy can be accurately determined, it is difficult for the apparatus of the above publication to provide high accuracy of the estimated vehicle slip angle β since the influences on the estimated vehicle slip angle β by the errors of the observed vehicle speed V and the observed yaw rate Yr cannot be eliminated.

SUMMARY OF THE INVENTION

An object of the present invention is to provide an improved vehicle state estimating apparatus in which the above-described problems are eliminated.

Another object of the present invention is to provide a vehicle state estimating apparatus which accurately determines an estimated quantity of a state of motion of the vehicle through a feedback control performed based on a difference between the observed quantity and the estimated quantity.

The above-mentioned objects of the present invention are achieved by a vehicle state estimating apparatus which includes: a slip-angle determining unit for determining a slip angle of a wheel of the vehicle; a friction-coefficient determining unit for determining a friction coefficient between a tire of the wheel and a road; a tire characteristics unit for outputting a lateral force of the wheel from the slip angle and the friction-coefficient based on predetermined tire characteristics; a vehicle-state estimating unit for determining an estimated quantity of a state of motion of the vehicle based on the lateral force output by the tire characteristics unit; a vehicle-state observing unit for outputting an observed quantity for the estimated quantity determined by the vehicle-state estimating unit; and a friction-coefficient correcting unit for correcting the friction coefficient determined by the friction-coefficient determining unit, based on a difference between the observed quantity and the estimated quantity, so that the lateral force output from the tire characteristics unit is corrected by the corrected friction coefficient.

In the vehicle state estimating apparatus of the present invention, when a significant difference between the observed quantity and the estimated quantity is produced, the friction coefficient is corrected by the friction-coefficient correcting unit based on the difference such that the lateral force output from the tire characteristics unit is corrected so as to eliminate the difference. The lateral force which is suited to the road condition for the vehicle can be accurately determined by the corrected friction coefficient generated by the vehicle state estimating apparatus, no matter how the road condition, the tire condition of the vehicle, and the errors of the signals from the sensors have considerably changed. Therefore, it is possible for the vehicle state estimating apparatus of the present invention to accurately determine the estimated quantity of the state of motion of the vehicle.

BRIEF DESCRIPTION OF THE DRAWINGS

The above and other objects, features and advantages of the present invention will become more apparent from the following detailed description when read in conjunction with the accompanying drawings in which.

DETAILED DESCRIPTION OF THE PREFERRED EMBODIMENT

A description will now be given of the preferred embodiment of the present invention with reference to the accompanying drawings.

Figure 2:
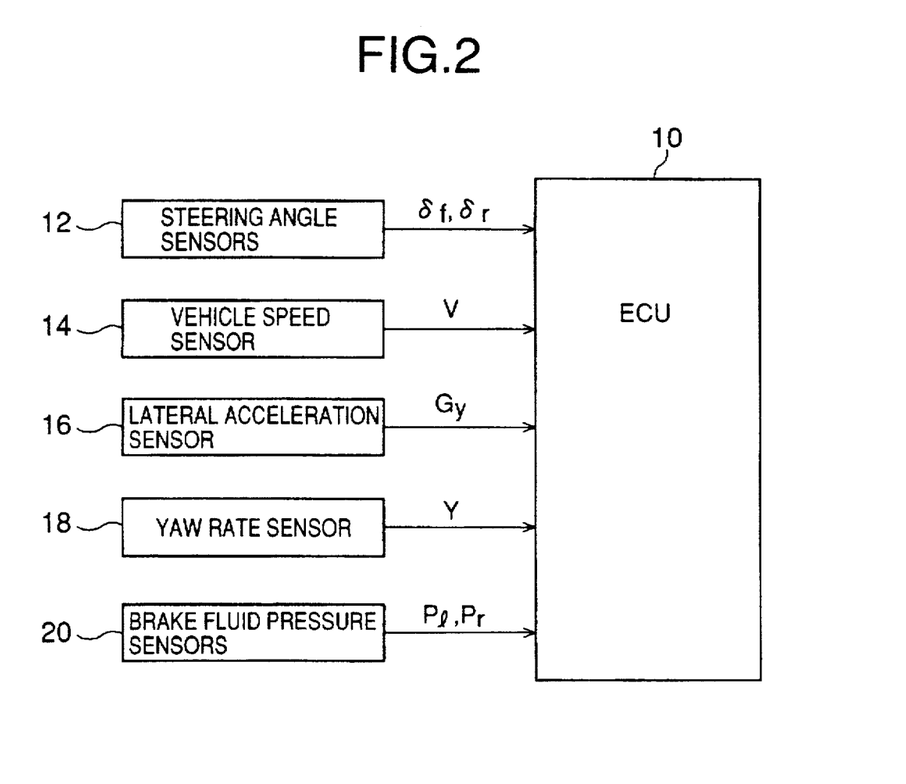
FIG.2 is a block diagram of a vehicle state estimating apparatus to which one embodiment of the present invention is applied.

FIG.2 shows a vehicle state estimating apparatus to which the preferred embodiment of the present invention is applied.

Referring to FIG.2, the vehicle state estimating apparatus includes an electronic control unit (ECU) 10. The ECU 10 has various inputs to which various sensors installed on a vehicle are connected. The ECU 10 determines an estimated vehicle slip angle ($\beta$) based on signals from the various sensors.

Steering angle sensors 12 are connected to inputs of the ECU 10. One of the steering angle sensors 12 outputs a signal indicative of a steering angle "$\delta f$" of front wheels of the vehicle, and the other steering angle sensor 12 outputs a signal indicative of a steering angle "$\delta r$" of rear wheels of the vehicle. The ECU 10 detects the front-wheel steering angle "$\delta f$" and the rear-wheel steering angle "$\delta r$" based on the signals output from the steering angle sensors 12.

A vehicle speed sensor 14 is connected to an input of the ECU 10. The vehicle speed sensor 14 outputs a pulsed signal by a period indicative of a vehicle speed "V" of the vehicle. The ECU 10 detects the vehicle speed "V" based on the period of the pulsed signal output from the vehicle speed sensor 14.

A lateral acceleration sensor 16 is connected to an input of the ECU 10. The lateral acceleration sensor 16 outputs a signal indicative of a lateral acceleration "Gy" on a center of gravity of the vehicle in a lateral direction perpendicular to a forward running direction of the vehicle. The ECU 10 detects the lateral acceleration "Gy" based on the signal output from the lateral acceleration sensor 16.

In the following, a lateral acceleration which is detected by the ECU 10 based on the signal from the sensor 16 is called an observed lateral acceleration "Gyr". In the present embodiment, it is supposed that the ECU 10 determines a value of the observed lateral acceleration "Gyr" as being positive (greater than zero) when the lateral acceleration Gy on the center of gravity of the vehicle is directed to the left of the vehicle, and as being negative (smaller than zero) when the lateral acceleration Gy on the center of gravity of the vehicle is directed to the right of the vehicle.

A yaw rate sensor 18 is connected to an input of the ECU 10. The yaw rate sensor 18 outputs a signal indicative of a yaw rate "Y" of the vehicle around a vertical axis at the center of gravity of the vehicle. The ECU 10 detects the yaw rate "Y" based on the signal output from the yaw rate sensor 18.

In the following, a yaw rate which is detected by the ECU 10 based on the signal from the sensor 18 is called an observed yaw rate "Yr". In the present embodiment, it is supposed that the ECU 10 determines a value of the observed yaw rate "Yr" as being positive (greater than zero) when the direction of the yaw rate Y around the vertical axis at the center of gravity of the vehicle is counter-clockwise, and as being negative (smaller than zero) when the direction of the yaw rate Y around the vertical axis at the center of gravity of the vehicle is clockwise.

Brake fluid pressure sensors 20 are connected to inputs of the ECU 10. Each of the brake fluid pressure sensors 20 outputs a signal indicative of a brake fluid pressure of one of respective wheel cylinders for the front and rear wheels of the vehicle. Based on the signals output from the brake fluid pressure sensors 20, the ECU 10 determines a left-wheel brake fluid pressure "Pl" (which is the average of brake fluid pressures of the wheel cylinders for the front-left wheel and the rear-left wheel of the vehicle) and a right-wheel brake fluid pressure "Pr" (which is the average of brake fluid pressures of the wheel cylinders for the front-right wheel and the rear-right wheel of the vehicle).

Figure 3:
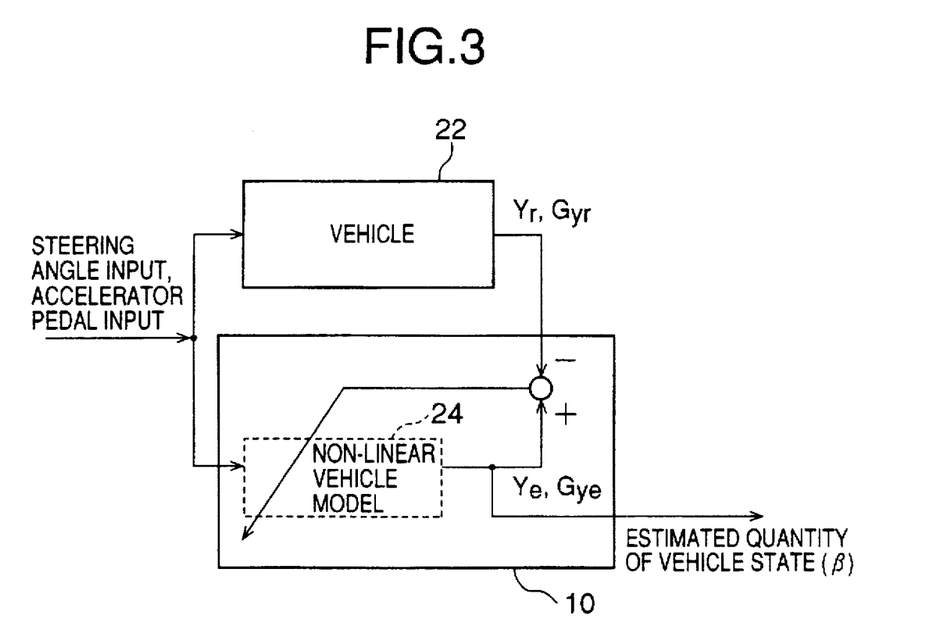
FIG.3 is a block diagram which is useful for explaining an operation of the vehicle state estimating apparatus in FIG.2.

FIG.3 shows an operation of the vehicle state estimating apparatus in FIG.2.

In FIG.3, the vehicle state estimating apparatus of the present embodiment is installed on an automotive vehicle 22. A steering angle input and an accelerator pedal input which are set by a vehicle operator on the vehicle 22 are supplied to the vehicle 22.

An observed yaw rate "Yr" and an observed lateral acceleration "Gyr" are generated from the vehicle 22 in response to the steering angle input and the accelerator pedal input.

The ECU 10 at this time detects the observed yaw rate "Yr" and the observed lateral acceleration "Gyr" based on the signals from the steering angle sensors 12 and the vehicle speed sensor 14.

The ECU 10 generates an estimated yaw rate "Ye", an estimated lateral acceleration "Gye", and an estimated vehicle slip angle "B" when the steering angle input and the accelerator pedal input are given, based on a non-linear vehicle model 24. The non-linear vehicle model 24 is provided within the ECU 10, as indicated by a dotted line in FIG.3.

In the following, a yaw rate which is estimated by the ECU 10 when a steering angle input and an accelerator pedal input are given is called the estimated yaw rate "Ye", and a lateral acceleration which is estimated by the ECU 10 when the steering angle input and the accelerator pedal input are given is called the estimated lateral acceleration "Gye".

If the non-linear vehicle model 24 is suited to a road condition under which the vehicle 22 is running, the estimated yaw rate "Ye" is equal to the observed yaw rate "Yr", and the estimated lateral acceleration "Gye" is equal to the observed lateral acceleration "Gyr". The ECU 10 at this time can accurately determine the estimated vehicle slip angle "β" based on the non-linear vehicle model 24.

On the other hand, if the non-linear vehicle model 24 is not suited to the road condition for the vehicle 22, a significant difference between the estimated yaw rate "Ye" and the observed yaw rate "Yr", and a significant difference between the estimated lateral acceleration "Gye" and the observed lateral acceleration "Gyr" may be produced.

In the vehicle state estimating apparatus of the present embodiment, a correction of the non-linear vehicle model 24 is performed to reduce both the difference between the estimated yaw rate "Ye" and the observed yaw rate "Yr" and the difference between the estimated lateral acceleration "Gye" and the observed lateral acceleration "Gyr".

Thus, when the correction of the non-linear vehicle model is performed, the non-linear vehicle model 24 can be suited to the road condition for the vehicle 22. Consequently, the ECU 10 can accurately determine the estimated vehicle slip angle "β" based on the non-linear vehicle model 24 after the correction is performed.

The above-mentioned function of the vehicle state estimating apparatus of the present embodiment is accomplished by the ECU 10, which will be described in the following.

Figure 4:
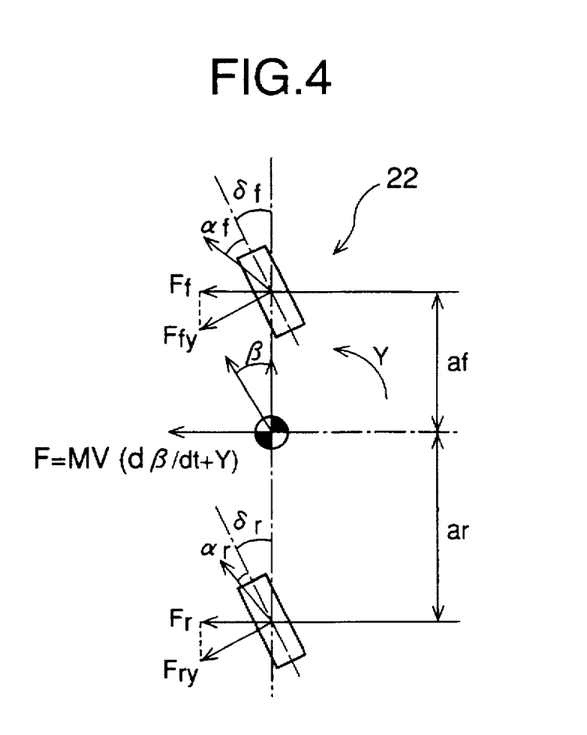
FIG.4 is a diagram showing a two-wheel model which is useful for analyzing a state of motion of a four-wheel vehicle.

FIG.4 shows a two-wheel vehicle model which is equivalent to the four-wheel vehicle 22 and is used for analyzing a state of motion of the vehicle 22 in FIG.3.

When the vehicle 22 is moving with the turning movement and the lateral movement, the lateral acceleration "Gy" acting on the center of gravity of the vehicle 22 is represented by the above Equation (2) using the vehicle speed "V", the yaw rate "Y", and the vehicle slip angle "β", as follows:

$$Gy = V \cdot Y + V \cdot d\beta/dt$$

Therefore, as shown in FIG.4, a resultant force "F" of the centrifugal force and the lateral force acting on the vehicle 22 when the vehicle 22 is moving is represented by the equation: $F = M \cdot Gy = M \cdot V(d\beta/dt + Y)$ where M is the mass of the vehicle 22.

Suppose that a lateral-direction component of a lateral force "Ffy" acting on the front-right and front-left wheels of the vehicle 22 is indicated by "Ff", and a lateral-direction component of a lateral force "Fry" acting on the rear-right and rear-left wheels of the vehicle 22 is indicated by "Fr". The equation of motion of the vehicle 22 is moving can be written as follows.

$$M \cdot V(d\beta/dt + Y) = Ff + Fr \qquad (4)$$

The lateral-direction components "Ff" and "Fr" in the above Equation (4) are represented by the following equations:

$$Ff = Ffy \cdot \cos\delta f \qquad (5)$$

$$Fr = Fry \cdot \cos\delta r \qquad (6)$$

where "δf" is a steering angle of the front wheels of the vehicle 22 and "δr" is a steering angle of the rear wheels of the vehicle 22.

In the above Equation (4), the mass "M" is considered the predetermined value. The vehicle speed "V" is detected based on the signal from the vehicle speed sensor 14. An approximate value of the yaw rate "Y" is determined by a previously-determined yaw rate "Ye". The front-wheel steering angle "δf" in the above Equation (5) and the rear-wheel steering angle "δr" in the above Equation (6) are detected based on the signals from the steering angle sensors 12.

Therefore, if the front-wheel lateral force "Ffy" and the rear-wheel lateral force "Fry" can be determined, the lateral-direction components "Ff" and "Fr" of the lateral forces can be determined, and it is possible to determine the differential coefficient "dβ/dt" of the vehicle slip angle in accordance with the above Equations (4)–(6).

As shown in FIG.4, a distance between the center of gravity of the vehicle 22 and a front axle of the vehicle 22 is indicated by "af", and a distance between the center of gravity of the vehicle 22 and a rear axle of the vehicle 22 is indicated by "ar". A moment which is represented by "af·Ff−ar·Fr" is produced around the vertical axis at the center of gravity of the vehicle 22 due to the lateral forces "Ffy" and "Fry". Regarding the representation of the moment in FIG.4, it is supposed that a moment to rotate the vehicle 22 around the vertical axis at the center of gravity in a counter-clockwise direction is positive.

The vehicle 22 includes a vehicle stability control (VSC) unit (not shown) which is installed thereon in order to provide increased stability of the attitude of the vehicle 22 by using a difference between the braking forces acting on the right and left wheels.

The VSC unit produces a difference between the braking forces acting on the right and left wheels of the vehicle 22 by supplying different braking fluid pressures to the right wheel cylinders for the right wheels and the left wheel cylinders for the left wheels when a certain operating condition of the vehicle is detected. By controlling the above function, the VSC unit produces a moment around the vertical axis at the center of gravity of the vehicle 22 by using the difference of the braking forces on the right and left wheels, in a direction to help the turning movement of the vehicle 22 or in a direction to cancel the turning movement of the vehicle 22.

Figure 5:
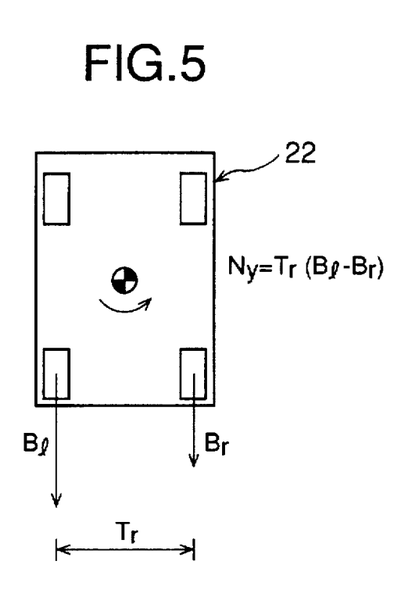
FIG.5 is a diagram which is useful for explaining a condition of moment around a vertical axis at the center of gravity of the vehicle when a great braking force acts on a left wheel of the vehicle and a small braking force acts on a right wheel of the vehicle.

FIG.5 shows a condition of a moment around the vertical axis at the center of gravity of the vehicle 22 when a great braking force "Bl" acts on the left wheel and a small braking force "Br" acts on the right wheel by using the above function of the VSC unit.

As shown in FIG.5, when the above function of the VSC unit is performed, a moment "Ny" is produced to rotate the vehicle 22 counter-clockwise around the vertical axis at the center of gravity of the vehicle 22. As shown in FIG.5, a wheel tread of the vehicle 22 is indicated by "Tr". The above moment "Ny" acting on the vehicle 22 is represented by the equation: Ny=Tr·(Bl−Br).

The braking force "Bl" acting on the left wheel and the braking force "Br" acting on the right wheel are proportional to the left-wheel brake fluid pressure "Pl" and the right-wheel brake fluid pressure "Pr", respectively. The brake fluid pressures "Pl" and "Pr" can be determined by the ECU 10 based on the signals from the brake fluid pressure sensors 20.

Therefore, the above moment "Ny" can be represented by the following equation:

$$Ny = Kp \cdot (Pl - Pr) \quad (7)$$

where Kp is a predetermined coefficient, Pl is the left-wheel brake fluid pressure, and Pr is the right-wheel brake fluid pressure.

As described above with reference to FIGS. 4 and 5, both the moment "af·Ff−ar·Fr" produced due to the lateral forces "Ffy" and "Fry" and the moment "Ny" produced due to the function of the VSC unit are exerted on the vehicle 22, and a yawing acceleration "dY/dt" proportional to a resultant moment of these moments act on the vehicle 22. Therefore, the equation of motion of the vehicle 22 is represented as follows.

$$I \cdot dY/dt = af \cdot Ff - ar \cdot Fr + Ny \quad (8)$$

where I is a yawing moment of inertia of the vehicle 22.

In the above Equation (8), the yawing moment "I" and the distances "af" and "ar" are the predetermined values. The brake fluid pressures "Pl" and "Pr" in the above Equation (7) are determined based on the signals from the brake fluid pressure sensors 20.

Therefore, if the front-wheel lateral force "Ffy" and the rear-wheel lateral force "Fry" can be determined, the lateral-direction components "Ff" and "Fr" of the lateral forces can be determined, and it is possible to determine the differential coefficient "dY/dt" of the yaw rate in accordance with the above Equations (7) and (8).

Generally, a tire lateral force "F" acting on a vehicle tire is determined according to a tire slip angle "α" and a road-to-tire friction coefficient "μ". The tire slip angle β is an angle between a direction of the tire center plane to a forward running direction of the tire.

Figure 6:
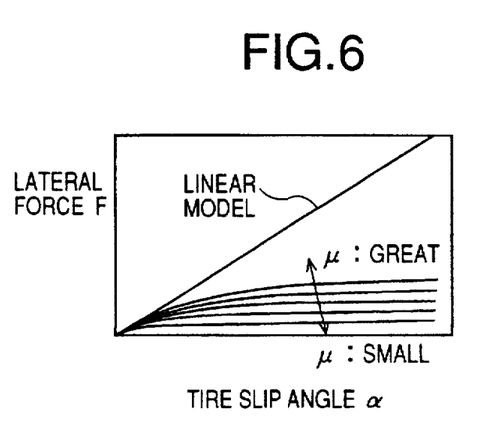
FIG.6 is a diagram showing an example of tire characteristics used by the vehicle state estimating apparatus in FIG.2.

FIG.6 shows an example of tire characteristics used by the vehicle state estimating apparatus in FIG.2. The tire characteristics define a non-linear relationship between the tire lateral force F and the tire slip angle a using the friction coefficient μ as the parameter for the relationship. If a tire lateral force and a friction coefficient are given, an estimated tire slip angle can be determined based on the tire characteristics.

As shown in FIG.6, when the slip angle α is small, the lateral force F changes in proportion to the slip angle α, regardless of whether the friction coefficient μ is great or small. When the slip angle α is increased to a great value, the lateral force F converges to an upper limit according to the friction coefficient μ. The greater the friction coefficient μ is, the greater the upper limit of the lateral force F is.

The vehicle state estimating apparatus of the present embodiment uses the tire characteristics in FIG.6 as follows.

The front-wheel lateral force "Ffy" and the rear-wheel lateral force "Fry" are formulated based on the tire characteristics in FIG.6 as follows:

$$Ffy = (Cf/Kf) \cdot \mu f \cdot \tan^{-1}\{(Kf/\mu f) \cdot \alpha f\}$$

$$Fry = (Cr/Kr) \cdot \mu r \cdot \tan^{-1}\{(Kr/\mu r) \cdot \alpha r\} \quad (9)$$

where αf is a tire slip angle of the front wheel, αr is a tire slip angle of the rear wheel, Cf is a cornering force acting on the front wheel, Cr is a cornering force acting on the rear wheel, μf is a coefficient of friction between the front wheel and the road, μr is a coefficient of friction between the rear wheel and the road, Kf is a tire model adaptation coefficient for the front wheel, and Kr is a tire model adaptation coefficient for the rear wheel.

By using the above Equations (9), the following requirements are met:

1) the lateral forces Ffy and Fry change in proportion to the cornering forces Cf and Cr when the slip angles αf and αr are small, 2) when the slip angles αf and αr are increased to a great value, the lateral forces Ffy and Fry converge to upper limits according to the friction coefficients μf and μr, and 3) the greater the friction coefficients μf and μr are, the greater the upper limits of the lateral forces Ffy and Fry are.

In the present embodiment, the above Equations (9) are used so as to meet these requirements 1) through 3). However, the present invention is limited to this embodiment. If the above requirements are met, a modification of the present embodiment may be made such that other equations be used instead of the above Equations (9).

Based on the vehicle model shown in FIG.4, the tire slip angles af and ar in the above Equations (9) are represented by the following:

$$\alpha f = \beta + \tan^{-1}(af \cdot Y/V) - \delta f$$

$$\alpha r = \beta - \tan^{-1}(ar \cdot Y/V) - \delta r \quad (10)$$

where β is the vehicle slip angle, V is the vehicle speed, Y is the yaw rate, δf is the front-wheel steering angle, and δr is the rear-wheel steering angle.

In the above Equations (10), the distances af and ar are considered the predetermined values, the yaw rate Y is detected based on the signal from the yaw rate sensor 18, and the steering angles δf and δr are detected based on the signals from the steering angle sensors 12. Therefore, if the vehicle slip angle β can be determined, it is possible to determine the tire slip angles af and af in accordance with the above Equations (10).

In the present embodiment, the ECU 10 periodically determines an estimated vehicle slip angle β at intervals of a predetermined time (for example, 5 msec.). The vehicle slip angle β does not considerably change during each interval (5 msec.). Therefore, when an estimated vehicle slip angle β is newly determined, it is possible for the present embodiment to determine the tire slip angles af and ar as the approximate values at the present cycle by substituting a previously-determined vehicle slip angle β into the above Equations (10).

Further, the cornering forces Cf and Cr in the above Equations (9) are considered constant. The cornering forces Cf and Cr of the front and rear wheels are determined depending on the road holding abilities of the front and rear tires of the vehicle 22. As described above, when an estimated vehicle slip angle β is newly determined, the approximate values of the tire slip angles af and ar at the present cycle can be determined by using the above Equations (10). Therefore, if the friction coefficients μf and μr at the present cycle can be determined, it is possible for the present embodiment to determine the lateral forces Ffy and Fry in accordance with the above Equations (9).

The ECU 10 of the present embodiment determines an estimated vehicle slip angle β at intervals of the predetermined time (5 msec.). In order to newly determine an estimated vehicle slip angle β at each cycle, the ECU 10 determines corrected friction coefficients μf and μr (which will be described later). By substituting the corrected friction coefficients μf and μr into the above Equation (9), the lateral forces Ffy and Fry can be determined based on the previously-corrected friction coefficients μf and μr and the presently-determined tire slip angles μf and μr.

If the lateral forces Ffy and Fry are determined, the lateral-direction components Ff and Fr of the lateral forces can be determined in accordance with the above Equations (5) and (6). Further, if the lateral-direction components Ff and Fr are determined, the differential coefficients dβ/dt and dY/dt of the vehicle slip angle and the yaw rate can be determined in accordance with the above Equations (4) and (8).

Accordingly, the vehicle state estimating apparatus of the present embodiment can determine the differential coefficient dβ/dt of the vehicle slip angle and the differential coefficient dY/dt of the yaw rate based on the previously-corrected friction coefficients μf and μr at intervals of the predetermined time (5 msec.). In the vehicle state estimating apparatus of the present embodiment, an estimated vehicle slip angle β is determined by obtaining a cumulative sum of the determined differential coefficients dβ/dt for the present cycle and the previous cycle, and an estimated yaw rate Ye is determined by obtaining a cumulative sum of the determined differential coefficients dY/dt for the present cycle and the previous cycle.

In order to enable the ECU 10 to determine the differential coefficient dβ/dt and the differential coefficient dY/dt at intervals of the predetermined time, it is necessary to transform the continuous system of the Equations (4) through (8) to an appropriate discrete system in which an estimated vehicle slip angle "β" and an estimated yaw rate "Ye" can be periodically determined by an estimating method in practical use.

In the vehicle state estimating apparatus of the present embodiment, the continuous system of the Equations (4) through (8) is transformed to the discrete system by using Tuskin transform:

$$s=(2/T)\cdot\{(z-1)/(z+1)\}$$

where T is a sampling time corresponding to the predetermined time used by the ECU 10, and z is a delay operator corresponding to $z\cdot x[n]=x[n-1]$.

By applying $s=(2/T)\cdot\{(z-1)/(z+1)\}$ to the above Equations (4) and (8), the following equations are obtained:

$$\beta[n] = (T/2)\cdot(db[n] + db[n-1]) + \beta[n-1] \quad (11)$$

$$db[n] = (Ff[n] + Fr[n])/M\cdot V[n] - Ye[n-1] \quad (12)$$

$$Ye[n] = (T/2)\cdot(dg[n] + dg[n-1]) + Ye[n-1] \quad (13)$$

$$dg[n] = (af\cdot Ff[n] + ar\cdot Fr[n] + Ny[n])/I \quad (14)$$

The "db[n]" in the above Equation (12) indicates the differential coefficient "dβ/dt" of the vehicle slip angle which is determined at the present cycle (the n-th cycle). As indicated by the above Equation (11), an estimated vehicle slip angle β[n] is determined at the present cycle by obtaining a sum of the previously-determined vehicle slip angle β[n−1] and the time T multiplied by the average of the presently-determined differential coefficient db[n] and the previously-determined differential coefficient db[n−1].

The "dg[n]" in the above Equation (14) indicates the differential coefficient "dYe/dt" of the yaw rate which is determined at the present cycle. As indicated by the above Equation (13), an estimated yaw rate Ye[n] is determined at the present cycle by obtaining a sum of the previously-determined yaw rate Ye[n−1] and the time T multiplied by the average of the presently-determined differential coefficient dg[n] and the previously-determined differential coefficient dg[n−1].

Accordingly, the vehicle state estimating apparatus of the present embodiment can determine, at intervals of the time T, an estimated vehicle slip angle β and an estimated yaw rate Ye based on the previously-corrected friction coefficients μf and μr.

When the previously-corrected friction coefficients μf and μr are suited to the road condition for the vehicle 22 at the present cycle, the estimated vehicle slip angle β and the estimated yaw rate Ye are exactly the same as the actual vehicle slip angle and the observed yaw rate Yr, respectively. When the previously-corrected friction coefficients μf and μr are not suited to the road condition at the present cycle, the deviation or error between the actual vehicle slip angle and the estimated vehicle slip angle β and the deviation or error between the observed yaw rate Yr and the estimated yaw rate Ye are present.

As indicated by the above Equation (4), if the estimated vehicle slip angle β and the estimated yaw rate Ye are determined, an estimated lateral acceleration Gye can be determined in accordance with the following equation:

$$Gye = V\ (d\beta/dt - Ye) \quad (15)$$

As described above, when the previously-corrected friction coefficients μf and μr are suited to the road condition for the vehicle 22 at the present cycle, the estimated lateral acceleration Gye is exactly the same as the observed lateral acceleration Gyr. When the previously-corrected friction coefficients μf and μr are not suited to the road condition at the present cycle, the deviation or error between the observed lateral acceleration Gyr and the estimated lateral acceleration Gye is present.

In the present embodiment, the deviation "dGy" between the observed lateral acceleration Gyr and the estimated lateral acceleration Gye, and the deviation "dY" between the observed yaw rate Yr and the estimated yaw rate Ye are respectively represented by the following equations:

$$dGy = (Gyr-Gye)\ \text{sign}(Gyr) \quad (16)$$

$$dY = (Yr-Ye)\ \text{sign}(Yr) \quad (17)$$

where sign(Gyr) indicates a sign of the observed lateral acceleration Gyr, and sign(Yr) indicates a sign of the observed yaw rate Yr.

As described above, the observed lateral acceleration Gyr is positive (greater than zero) when the lateral acceleration on the center of gravity of the vehicle is directed to the left of the vehicle, and the observed yaw rate "Yr" is positive (greater than zero) when the direction of the yaw rate around the vertical axis at the center of gravity of the vehicle is counter-clockwise. In accordance with those described above, the estimated lateral acceleration Gye in the above Equation (15) is defined as being positive when the lateral acceleration is directed to the left of the vehicle, and the estimated yaw rate Ye in the above Equation (14) is defined as being positive when the direction of the yaw rate is counter-clockwise.

The deviation "dGy" in the above Equation (16) is positive when the absolute value of Gyr is above the absolute value of Gye, and it is negative when the absolute value of Gyr is below the absolute value of Gye. This is true regardless of whether the sign of the observed lateral acceleration Gyr is positive or negative.

Therefore, when dGy>0, it is determined that the friction coefficients μf and μr which are used to determine the estimated lateral acceleration Gye at the present cycle are smaller than the actual friction coefficients of the road condition for the vehicle. In this case, correcting the friction coefficients μf and μr to greater values is required.

On the other hand, when dGy<0, it is determined that the friction coefficients μf and μr which are used to determine the estimated lateral acceleration Gye at the present cycle are greater than the actual friction coefficients of the road condition for the vehicle. In this case, correcting the friction coefficients μf and μr to smaller values is required.

The deviation "dY" in the above Equation (17) is positive when the absolute value of Yr is above the absolute value of Ye, and it is negative when the absolute value of Yr is below the absolute value of Ye. This is true regardless of whether the sign of the observed yaw rate Yr is positive or negative.

Therefore, when dY >0, it is determined that the front-wheel friction coefficient μf is smaller than the rear-wheel friction coefficient μr, the resulting yaw rate being greater than expected. In this case, correcting the rear-wheel friction coefficient μr to a smaller value is required.

On the other hand, when dY <0, it is determined that the friction coefficient μf is greater that the friction coefficient μr, the resulting yaw rate being smaller than expected. In this case, correcting the front-wheel friction coefficient μf to a smaller value is required.

In order to meet the above-mentioned requirements in the vehicle state estimating apparatus of the present embodiment, the friction coefficients μf and μr are corrected in accordance with the following equations.

$$\mu of = \mu fn-1+kgf \cdot dGy \quad (18)$$

$$\mu ro = \mu rn-1+kgr \cdot dGy \quad (19)$$

$$\mu f = \mu of +krf \cdot dGy \quad (20)$$

$$\mu r = \mu ro +krr \cdot dGy \quad (21)$$

The "μfn−1" and "μrn−1" in the above Equations (18) and (19) indicate the previously-corrected friction coefficients used to determine the estimated lateral acceleration Gye at the present cycle. The "kgf", "kgr", "krf" and "krr" in the above Equations (18) through (21) are predetermined values. In the present embodiment, the presently-corrected friction coefficients μf and μr can be determined based on the previously-determined friction coefficients in accordance with the above Equations (18) through (21) such that the deviations dGy and dY are reduced to zero.

Therefore, since the friction coefficients are corrected as described above, the lateral forces Ffy and Fry which are suited to the actual road condition for the vehicle 22 can be determined in accordance with the above Equation (9) at the following cycle. Thus, it is possible for the vehicle state estimating apparatus of the present embodiment to accurately determine an estimated vehicle slip angle β which is suited to the actual road condition.

Figure 7:
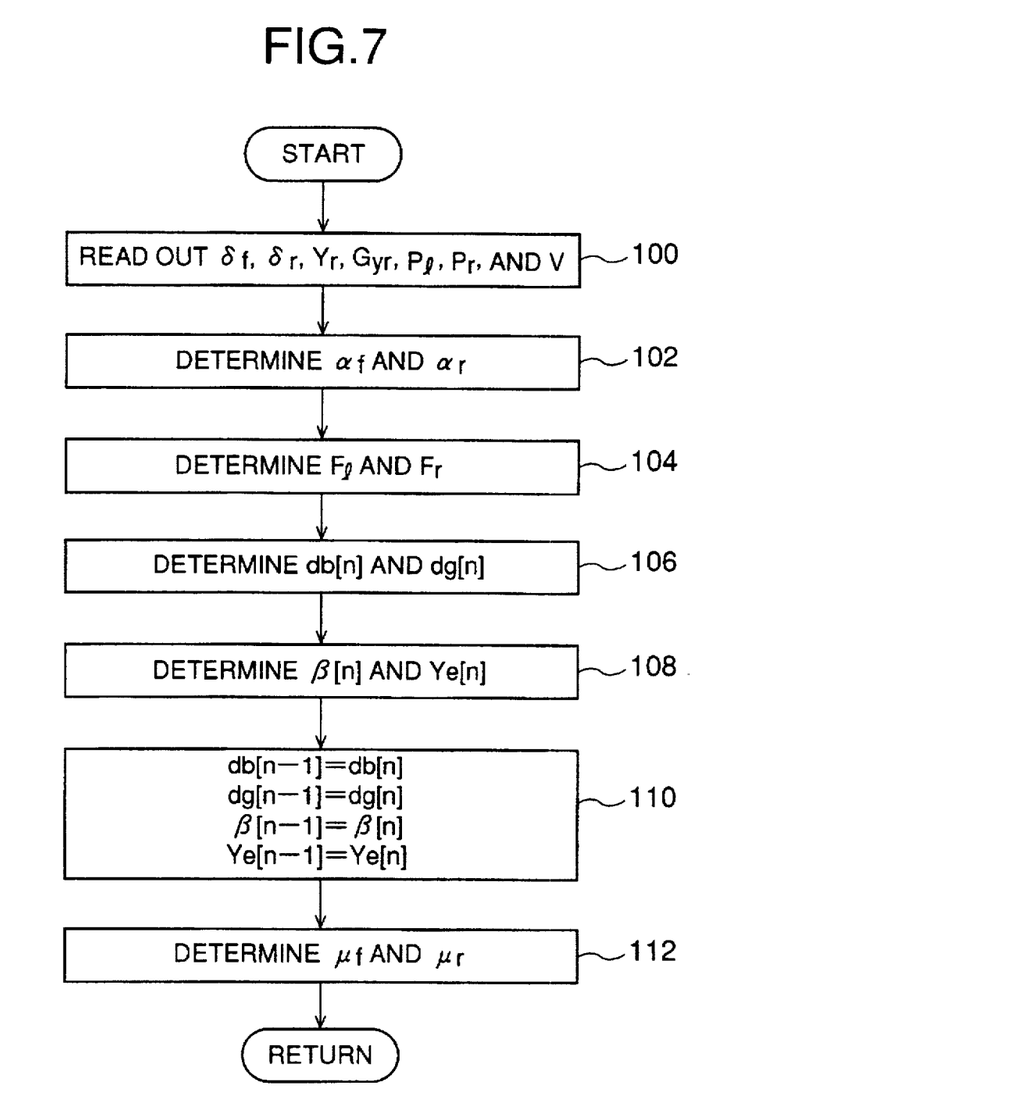
FIG.7 is a flowchart which is useful for explaining a control routine executed by the vehicle state estimating apparatus in FIG.2.

FIG. 7 shows a control routine executed by the ECU 10 of the vehicle state estimating apparatus in FIG. 2. By performing the control routine in FIG. 7, the above-described estimation of the vehicle slip angle β and the above-described correction of the friction coefficients μf and μr are carried out. The execution of the control routine in FIG.7 is periodically started at intervals of a predetermined time (which is, for example, 5 msec.).

When the execution of the control routine in FIG.7 is started, the ECU 10 at step 100 reads out a front-wheel steering angle δF , a rear-wheel steering angle εr, an observed yaw rate Yr, an observed lateral acceleration Gyr, brake fluid pressures Pl and Pr, and the vehicle speed V.

After the step 100 is performed, step 102 determines slip angles αf and αr of the front and rear wheels by substituting the read-out parameters and a previously—determined vehicle slip angle β into the above Equations (10).

After the step 102 is performed, step 104 determines lateral forces Ffy and Fry of the front and rear wheels; by substituting the presently-determined slip angles af and ar and the previously-corrected friction coefficients μf and μr into the above Equations (9). Further, step 104 determines the lateral-direction components Ff and Fr of the lateral forces Ffy and Fry by substituting the presently-determined lateral forces Ffy and Fry into the above Equations (5) and (6).

After the step 104 is performed, step 106 determines the db[n] and the dg[n] in accordance with the above Equation (12) and the above Equation (14), respectively. The determinations of the db[n] and the dg[n] at this step are performed by substituting various parameters into the Equations (12) and (14), the parameters including: the presently-determined Ff[n] and Fr[n], the presently-read-out vehicle speed V[n], the presently-determined moment Ny[n] for the presently-readout brake fluid pressures Pl and Pr, the previously-estimated vehicle slip angle β[n−1], and the previously-estimated yaw rate Ye[n−1].

After the step 106 is performed, step 108 determines an estimated vehicle slip angle β[n] and an estimated yaw rate Ye[n] in accordance with the above Equation (11) and the above Equation (13), respectively. The determinations of the β[n] and the Ye[n] at this step are performed by substituting various parameters into the Equations (11) and (13), the parameters including: the presently-determined db[n], the presently-determined dg[n], the previously-determined db[n−1], the previously-determined dg[n−1], the previously-estimated vehicle slip angle β[n−1], and the previously-estimated yaw rate Ye[n−19.

After the step 108 is performed, step 110 stores the presently-determined parameters db[n], dg[n], β[n], and Ye[n] in a memory of the ECU 10 as the previously-determined parameters db[n−1], dg[n−1 ], β[n−1], and Ye[n−1]. That is, at this step, the previously-determined parameters db[n−1], dg[n−1], β[n−1], and Ye[n−1] are updated by the presently-determined parameters db[n], dg[n], β[n], and Ye[n].

After the step 110 is performed, step 112 determines corrected friction coefficients μf and μr in accordance with the above Equations (15) through (21) based on the presently-estimated vehicle slip angle β and the presently-estimated yaw rate Ye. As described above, at this step 112, the corrected friction coefficients µf and µr are determined based on the deviation dGy or dY (the Equation (16) or (17)) and the previously-determined friction coefficients in accordance with the Equations (18) through (21). After the corrected friction coefficients µf and pr are determined at this step, the control routine in FIG.7 at the present cycle ends.

In the vehicle state estimating apparatus of the present embodiment, the signal output by the lateral acceleration sensor 16 may be influenced by the disturbance such as a road cant or a vehicle roll. When the signal from the lateral acceleration sensor 16 contains a significant error due to the disturbance, it is likely that the estimated friction coefficients µf and µr are not suited to the road condition.

Figure 1:
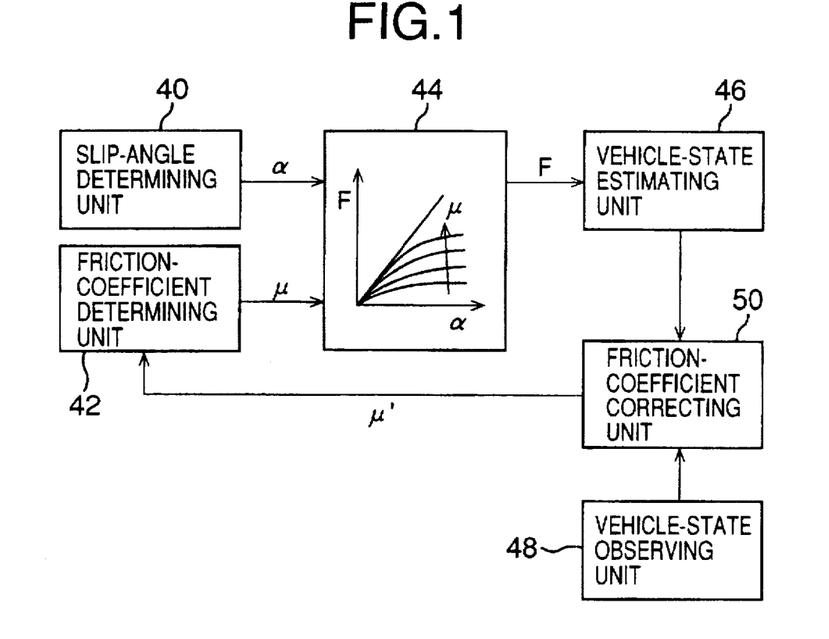
FIG.1 is a block diagram which is useful for explaining a vehicle state estimating apparatus according to a basic concept of the present invention.

Next, FIG.1 shows a vehicle state estimating apparatus according to a basic concept of the present invention. The basic concept of the present invention may be apparent from the foregoing detailed description of the vehicle state estimating apparatus of the present embodiment.

As shown in FIG. 1, according to the basic concept of the present invention, a slip-angle determining unit 40 determines a slip angle (α) of a wheel of a vehicle. A friction-coefficient determining unit 42 determines a friction coefficient (µ) between a tire of the wheel and a road. A tire characteristics unit 44 generates a lateral force (F) of the wheel from the slip angle (α) from the slip-angle determining unit 40 and the friction coefficient (µ) from the friction-coefficient determining unit 42, based on predetermined tire characteristics.

In the vehicle state estimating apparatus according to the present invention, a vehicle-state estimating unit 46 determines an estimated quantity (β, Ye, Gye) of a state of motion of the vehicle based on the lateral force output by the tire characteristics unit 44.

A vehicle-state observing unit 48 detects an observed quantity (Yr, Gyr) for the estimated quantity determined by the vehicle-state estimating unit 46.

A friction-coefficient correcting unit 50 corrects the friction coefficient determined by the friction-coefficient determining unit 42, based on a difference (dY, dGy) between the observed quantity from the vehicle-state observing unit 48 and the estimated quantity from the vehicle-state estimating unit 46, so that the lateral force (F) generated by the tire characteristics unit 44 is corrected by the corrected friction coefficient "µ'".

In the above-described vehicle state estimating apparatus, the slip-angle determining unit 40 is constructed by the step 102 performed by the ECU 10 in accordance with the Equations (10). The friction-coefficient determining unit 42 and the friction-coefficient correcting unit 50 are constructed by the step 112 performed by the ECU 10 in accordance with the Equations (16)–(21). The vehicle-state estimating unit 46 is constructed by the steps 104–108 performed by the ECU 10 in accordance with the Equations (9), (5), and (11)–(14). At least one of the vehicle slip angle β, the estimated yaw rate Ye, and the estimated lateral acceleration Gye is the estimated quantity determined by the vehicle-state estimating unit 46. Further, the vehicle-state observing unit 48 is constructed by the ECU 10 which detects the observed lateral acceleration (Gyr) or the observed yaw rate (Yr) based on the signal from the lateral acceleration sensor 16 or the signal from the yaw rate sensor 18. At least one of the observed lateral acceleration (Gyr) and the observed yaw rate (Yr) is the observed quantity output by the vehicle-state observing unit 48.

In the above-described vehicle state estimating apparatus, when a significant difference between the observed quantity and the estimated quantity is produced, the friction coefficient is corrected by the friction-coefficient correcting unit 50 based on the difference such that the lateral force output from the tire characteristics unit 44 is corrected so as to eliminate the difference. The lateral force which is suited to the road condition for the vehicle can be accurately determined by the corrected friction coefficient generated by the vehicle state estimating apparatus, no matter how the road condition, the tire condition of the vehicle, and the errors of the signals from the sensors have considerably changed. Therefore, it is possible for the vehicle state estimating apparatus of the present invention to accurately determine the estimated quantity of the state of motion of the vehicle.

What is claimed is:

1. An apparatus for determining an estimated quantity of a state of motion of a vehicle, comprising:

slip-angle determining means for determining a slip angle of a wheel of the vehicle;

friction-coefficient determining means for determining a friction coefficient between a tire of the wheel and a road;

tire characteristics means for generating a lateral force on the wheel from the slip angle and the friction coefficient based on predetermined tire characteristics;

vehicle-state estimating means for determining an estimated quantity of the state of motion of the vehicle based on the lateral force from said tire characteristics means;

vehicle-state observing means for detecting an observed quantity for the estimated quantity determined by said vehicle-state estimating means; and friction-coefficient correcting means for correcting the friction coefficient determined by said friction-coefficient determining means, based on a difference between the observed quantity and the estimated quantity, so that the lateral force output from said tire characteristics means is corrected by said corrected friction coefficient.

2. The apparatus according to claim 1, wherein said vehicle-state estimating means determines a presently-estimated vehicle slip angle based on the lateral force from said tire characteristics means and a previously-determined vehicle slip angle at each of intervals of a predetermined time.

3. The apparatus according to claim 1, wherein said vehicle-state estimating means determines a presently-estimated yaw rate based on the lateral force from said tire characteristics means and a previously-determined yaw rate at each of intervals of a predetermined time.

4. The apparatus according to claim 1, wherein said vehicle-state estimating means determines at least one of an estimated vehicle slip angle, an estimated yaw rate, and an estimated lateral acceleration, based on the lateral force from the tire characteristics means.

5. The apparatus according to claim 1, wherein said friction-coefficient correcting means performs the determination of the corrected friction coefficient at intervals of a predetermined time.

6. The apparatus according to claim 1, wherein said friction-coefficient correcting means performs the determination of the corrected friction coefficient at intervals of a predetermined time such that a presently-corrected friction coefficient is determined based on said difference and a previously-corrected friction coefficient.

7. The apparatus according to claim 1, wherein said vehicle-state observing means detects at least one of an observed lateral acceleration and an observed yaw rate based on a signal output from a lateral acceleration sensor of the vehicle and a signal output from a yaw rate sensor of the vehicle.

8. A method of determining an estimated quantity of a state of motion of a vehicle, comprising steps of:
   determining a slip angle of a wheel of the vehicle;
   determining a friction coefficient between a tire of the wheel and a road;
   generating a lateral force of the wheel from the slip angle and the friction coefficient based on predetermined tire characteristics;
   determining an estimated quantity of the state of motion of the vehicle based on said lateral force;
   detecting an observed quantity for said estimated quantity based on a signal from a sensor on the vehicle; and
   determining a corrected friction coefficient based on a difference between the observed quantity and the estimated quantity, so that the lateral force generated based on the predetermined tire characteristics is corrected by said corrected friction coefficient.

9. The method according to claim 8, wherein said step of determining the corrected friction coefficient is performed at intervals of a predetermined time.

10. The method according to claim 8, wherein said step of determining the corrected friction coefficient is performed at intervals of a predetermined time such that a presently-corrected friction coefficient is determined based on said difference and a previously-corrected friction coefficient.

* * * * *